US007198490B1

(12) United States Patent
Olsen

(10) Patent No.: US 7,198,490 B1
(45) Date of Patent: Apr. 3, 2007

(54) APPARATUS AND METHOD FOR TRAINING USING A HUMAN INTERACTION SIMULATOR

(75) Inventor: Dale E. Olsen, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/448,617

(22) Filed: Nov. 23, 1999

Related U.S. Application Data

(60) Provisional application No. 60/109,974, filed on Nov. 25, 1998.

(51) Int. Cl.
*G09B 11/00* (2006.01)

(52) U.S. Cl. .................. 434/365; 434/323; 434/219; 345/956

(58) Field of Classification Search ............... 434/350, 434/236–238, 167; 707/4; 345/352; 706/2, 706/11, 927
See application file for complete search history.

(56) References Cited

U.S. PATENT DOCUMENTS

| | | | | | |
|---|---|---|---|---|---|
| 4,305,131 | A | * | 12/1981 | Best | 345/716 |
| 5,251,294 | A | | 10/1993 | Abelow | 395/155 |
| 5,358,259 | A | | 10/1994 | Best | 273/434 |
| 5,367,454 | A | * | 11/1994 | Kawamoto et al. | 345/706 |
| 5,377,997 | A | | 1/1995 | Wilden et al. | 273/434 |
| 5,393,073 | A | | 2/1995 | Best | 273/434 |
| 5,604,855 | A | | 2/1997 | Crawford | 395/173 |
| 5,676,551 | A | * | 10/1997 | Knight et al. | 434/236 |
| 5,721,845 | A | * | 2/1998 | James et al. | 395/326 |
| 5,730,603 | A | * | 3/1998 | Harless | 434/308 |
| 5,781,704 | A | | 7/1998 | Rossmo | 395/75 |
| 5,805,784 | A | | 9/1998 | Crawford | 395/173 |
| 5,807,173 | A | | 9/1998 | Aoyama | 463/23 |
| 5,815,417 | A | | 9/1998 | Orr et al. | 364/578 |
| 5,864,844 | A | * | 1/1999 | James et al. | 707/4 |
| 5,873,057 | A | | 2/1999 | Eves et al. | 704/201 |
| 6,598,020 | B1 | * | 7/2003 | Kleindienst et al. | 704/270 |

OTHER PUBLICATIONS

Chandra, A. "A computational architecture to model human emotions", Intelligent Information Systems, 1997. IIS '97. Proceddings, 1997 pp. 86-89.*
Chandra, Arun "A Computational Architecture to Model Human Emotions", Mar. 1997, IEEE No. 0-8186-8218, pp. 86-89.*
Kawakami et al "Construction of 3-D Emotiona Space Based on Parameterized Face", IEEE International Workshop on Robot and Human Comunication Jun. 1994 pp. 216-221.*

* cited by examiner

*Primary Examiner*—Kathleen Mosser
(74) *Attorney, Agent, or Firm*—Francis A. Cooch

(57) ABSTRACT

A computer based training tool and method that emulates human behavior using a computer-simulated person in a realistic scenario. It provides an interactive experience in detecting deception during interviews and acceptance of statements during interpersonal conversations. The simulated person provides verbal responses in combination with an animated video display reflecting the body language of the simulated person in response to questions asked and during and after responses to the questions. The questions and responses are pre-programmed and interrelated groups of questions and responses are maintained in dynamic tables which are constantly adjusted as a function of questions asked and responses generated. The system provides a critique and numerical score for each training session.

19 Claims, 8 Drawing Sheets

Simulated Man (SIMAN)
File  Say Again  Help  PlayBack  Rights

Questions
Hi, I'm Chris Miller with the FBI. How are you today?

Response
Fine. I'm Michael Simmen

Clues Indicated
○ Truth   ● Nothing   ○ Deception

Start Interview
End Interview

Follow Up Questions          Query

| Questions by Category | Opening | Personal | Background | Bank | Financial | | |
|---|---|---|---|---|---|---|---|
| | Gambling | Affair | Saturday | Jones | Indicators | ATM | |
| | | | | | Family | College | Drugs |
| | | | | | | | All |

Possible Questions
I'll try not to take any more time than necessary, but I need to discuss several important issues. But first do you prefer to be called Mike or Michael?
Do most people call you Michael or Mike? What do you prefer?
Do you know what this is all about?
I'm here to resolve the ATM shortage that occurred last Saturday.
I appreciate your taking the time to talk with me. I'm looking into the ATM audit discrepancy, and I hope you can help me out with this.
So you'll know who you are talking with, let me show you some identification.
I'm here to determine who's involved in taking the missing money.
I'm here to investigate the embezzlement of over $43,000 from your branch.
I'd like to take a few minutes to get to know a little about you.

Subject Model

Subject State: Rapport 2

Select question value (0-10) and click on compute

| Question Value | No. of Questions | Weighted Score | Total Score | | Memory |
|---|---|---|---|---|---|
| 4.99 | 0 | 0 | 0 | | 0.45 |

Select for Random Questions ☑

[Compute]  [Exit]  [Show person]

Rapport State

| Behavior | Worst | Poor | Average | Good | Best |
|---|---|---|---|---|---|
| | .387 | .513 | .01 | .052 | .338 |

In or Leaving State: Poor     Adding to State: Poor

Personality

| | | | | | |
|---|---|---|---|---|---|
| Stickiness | .4 | .6 | .3 | .2 | .3 |
| Change Factor | 0.7 | 0.75 | 0.65 | 0.7 | 0.6 |
| Limit to Change | | | | | |
| | Speed Forward 1 | | | Speed Backward 1.5 | |

Personality — Forward Transition Probabilities

Move to

| Starting with | Wrst | Poor | Avge | Good | Best |
|---|---|---|---|---|---|
| Anger | | .7 | .2 | .09 | .01 |
| Denial | .38 | | .3 | .27 | .05 |
| Depression | .25 | .2 | | .4 | .15 |
| Bargaining | .2 | .1 | .2 | | .5 |
| Acceptance | | | | | 1.00 |

Backward Transition Probabilities

Move to

| Starting with | Wrst | Poor | Avge | Good | Best |
|---|---|---|---|---|---|
| Anger | 1.00 | | | | 0 |
| Denial | .95 | | .02 | .03 | .01 |
| Depression | .5 | .48 | | .01 | .01 |
| Bargaining | .45 | .45 | .09 | | |
| Acceptance | .3 | .47 | .08 | .15 | |

FIG. 8

APPARATUS AND METHOD FOR TRAINING USING A HUMAN INTERACTION SIMULATOR

CROSS REFERENCE TO RELATED APPLICATION

This application claims priority from U.S. Provisional Application No. 60/109,974, filed Nov. 25, 1998.

STATEMENT OF GOVERNMENTAL INTEREST

This invention was made with Government support under Contract No. J-FBI-97-004 awarded by the Department of Justice. The Government has certain rights in the invention.

BACKGROUND OF THE INVENTION

1. Field of the Invention

This invention relates to a training process for perfecting interview techniques and other interpersonal skills using a computer simulated person and a PC-based or other type computer, training tool that emulates human behavior using the computer-simulated person in a realistic scenario.

2. Discussion of the Related Art

For years, law enforcement agents have used verbal and nonverbal clues to detect deception. Much of the original research showing the validity of the technique was done by Reid and Associates. It is most readily available as part of course work provided by their company which includes a course oriented text titled, "The Reid Technique of Interviewing and Interrogation", John E. Reid and Associates, Chicago, 1991. In addition, Paul Ekman in "Telling Lies: Clues to Deceit in the Marketplace, Politics and Marriage", published by W. N. Norton and Co., Inc., New York, 1985, "Who Can Catch A Liar?", published in *American Psychologist*, 46, 913–920, 1991, and Stan Walters in "Principles of Kinesic Interview and Interrogation", published by CRC Press, Boca Raton, Fla., 1995 have made contributions to that body of knowledge. The skills required to detect deception based on verbal and nonverbal clues are difficult to acquire. Therefore, simulators are needed to train people to deal with social and behavioral issues and situations. To maximize their effectiveness, the simulators must provide an engaging environment where the student can experience various realistic situations and provide different responses. To be beneficial, the simulators must rely on the recent developments in modeling and simulation, sociology, psychology, and other fields.

To be effective, practice is required for training related to a wide range of skills. Government and industry have designed and developed sophisticated simulators so trainees can obtain ample practice and acquire experience without risking lives or expensive equipment. Pilots practice on flight simulators before flying aircraft; military personnel use war-gaming simulators to practice executing missions; medical personnel use computer simulations to practice triage as part of their training. Training simulation technology has, as a result of the process of developing such sophisticated simulators, progressed to the point where it can be used successfully to help develop a variety of interpersonal skills, such as interview of suspects in criminal investigations.

SUMMARY OF THE INVENTION

A primary object of the present invention is to provide a means and apparatus to aid individuals in developing a variety of interpersonal skills, such as interviewing suspects in criminal investigations.

Another object of the present invention is to create a computer-simulated person incorporating a simulated brain and capability of remembering the nature of questions asked or statements made by the user and their appropriateness with respect to the current interactions.

A still further object of the present invention is to provide responses based on typical patterns of behavior and history of a simulated conversation.

Yet another object of the present invention is to provide a system for training students to interview for the purpose of detecting signs of deception from a suspect in a criminal case.

A further object of the present invention is to provide an interactive system for conversational skills training.

A still further object of the present invention is to provide a simulator for interpersonal training comprising logical and emotional components implemented by way of a computer simulation.

Yet another object of the present invention is to provide an interactive system in which responses are affected by the status of a simulated subject.

Another object of the present invention is to provide an interactive system in which responses are affected by the emotional state of a simulated person.

A still further object of the present invention is to provide a visual image of the subject wherein the expression, posture and position of the head, arms, hands, fingers, legs and feet change in response to asked questions and during and after responses thereto.

These objects are achieved by providing an interactive system for conversational training which includes an interface and simulated brain. The interface allows a user to easily navigate through many possible questions and to watch and hear the simulated subject respond. The possible questions are pre-programmed and indexed in sub-listings so they can be found by, (1) selecting a question category and looking through the questions in that category window, (2) examining a follow-up question window to find questions suggested by the system, or (3) querying the system for questions involving specific words such as "promotion". The interface also adds new questions and comments to the sub-listings as information becomes available and eliminates questions that have lost their relevance.

The simulated brain includes a logical component and an emotional component. The logical component selects one of a series of responses to the questions. The selection is based on the likelihood of each of the responses given the current circumstances. The circumstances are affected by the state of the simulated subject (for example, guilt or innocence in a criminal investigation) and the emotional state of the subject. The logical component keeps track of the information provided in the responses and tries to maintain consistency in responses.

The emotional component is critical in the random selection of the response. The emotional state of the simulated subject is determined by, (1) the state of the subject at the beginning of the interview, (2) the entire discussion (questions and statements) history, (3) the more recent questions and statements, (4) the last question or statement, (5) the subject status (guilt or innocent) and (6) chance. A stochastic model determines the ebb and flow of the subject's emotional state as questions are asked and responses are given. The parameters can be tuned to affect the simulated personality. For example, the simulated subject may give poorly worded statements or may get upset by the wording of questions and be slow to respond.

In one embodiment, a system trains students to interview for the purpose of detecting signs of deception from a potential suspect in a criminal case. Thus, it teaches student-investigators to detect deception, develop listening skills, formulate good questions, build rapport and develop themes for interrogation. The student attempts to determine if the simulated subject is attempting deception by watching both the verbal and non-verbal behavior. As part of the exercise, the student develops rapport by creating an environment where the simulated subject is comfortable and will provide complete and informative responses. Each question or statement from the student is rated according to how it contributes to the student-subject rapport.

Some statements or questions available to the student make the simulated subject feel comfortable or the investigator less of a threat and contribute to rapport building and have positive rapport ratings. Other statements or questions make the simulated subject feel defensive or offend in some way and contribute to a negative rapport. Some statements or questions may have a negative effect on rapport, but help to determine the guilt status (veracity) of the subject. To successfully interact with the simulated subject, the student makes the subject feel that he or she is contributing to the investigation by answering difficult questions. Questions are also evaluated according to their diagnostic value and both the rapport and diagnostic ratings contribute to the student-user's overall evaluation. These ratings depend on the rapport or emotional state of the simulated subject. A hostile subject may interpret the intent of the question, "Who do you think took the money?" differently than a subject who is trying to be helpful.

The system grades the quality of the interview by considering several factors including, but not limited to, the rapport and diagnostic value of the statements and questions. A correct determination of the veracity (truthful or deceptive) of the subject and the detection of clues contribute to the interviewer's grade. When the subject makes an error and reveals behavioral information indicating deception (verbal or non-verbal) or provides a response that would be unusual for a deceptive subject, i.e., indicating that he or she is truthful, the student indicates, by choosing an appropriate button, that evidence of deception or non-deception has just been provided. The proper identification of these clues increases the interviewer's grade.

The system has several user-selected options. For example, either a male or a female voice can be used to ask questions or make statements. The interview may be conducted at the beginner, intermediate, advanced or professional level, with fewer clues provided at the more challenging levels. Many of the questions can be asked in any of a number of ways, some hurting rapport and some helping rapport. The simulated subject may ask the student-investigator a question in return. If so, the student can choose to ignore it or respond using a reply found in the follow-up window. The system remembers the sequence of questions and responses from the interview so that the entire interview can be replayed. During replay, the system identifies any unusual behavior in writing.

The interactive system can be used to train in many different areas. It can, for example, be used to help in training children in the campaign to "Just Say No", medical students, or any other area where human interactive training of any type is required.

Other objects, features and advantages of this invention will be apparent from the following drawings, specification and claims.

BRIEF DESCRIPTION OF THE DRAWINGS

FIG. 5 is a computer display showing the "User Input" screen according to the present invention;

FIG. 8 is an exemplary image of the control panel screen used to input the subject's personality parameters into the fundamental program of the present invention.

DESCRIPTION OF THE PREFERRED EMBODIMENTS

Figure 1:
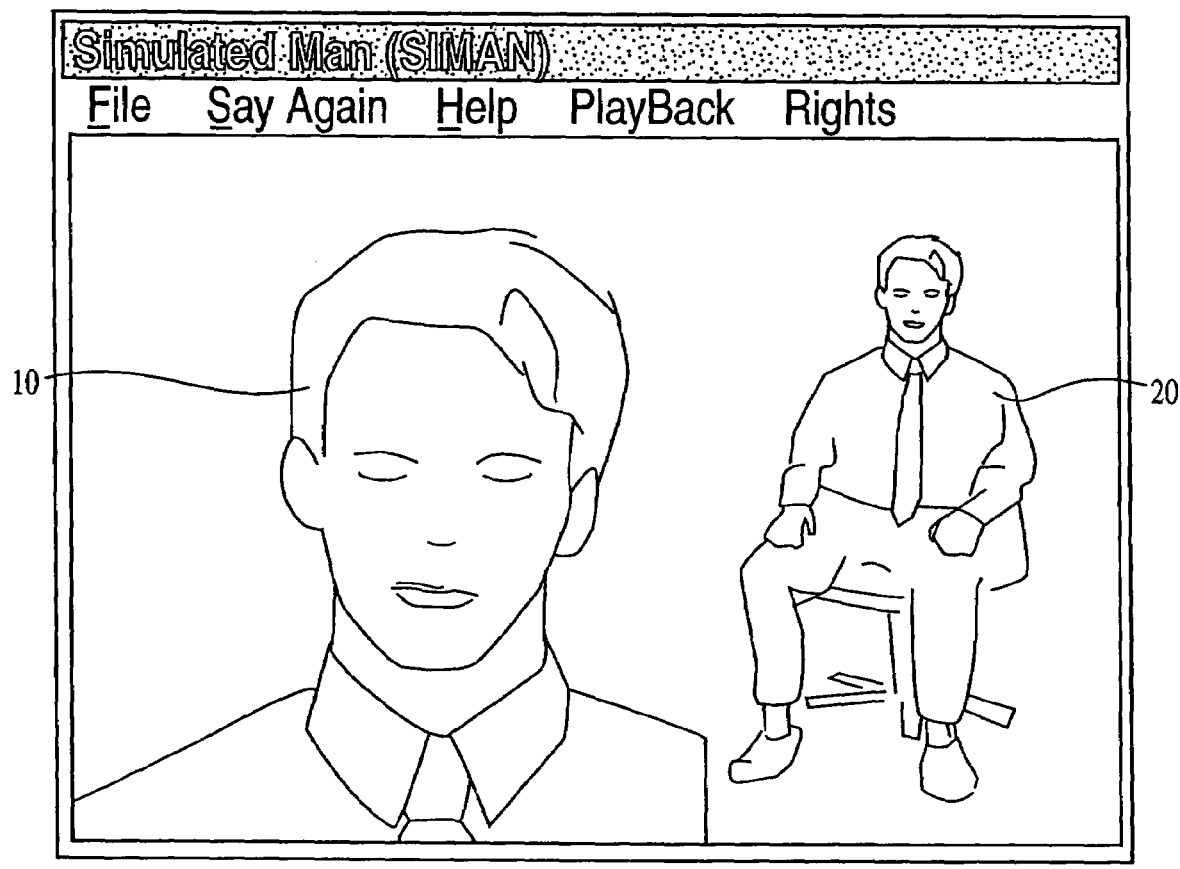
FIG. 1 is a stylized image of the computer-generated display of the simulated subject according to the present invention.

FIG. 1 is exemplary of a typical display created by the subject invention to provide visual clues relating to the emotional state of the simulated subject. The expression, as best seen in the enlarged image 10, of the simulated subject changes in response to asked questions and during and after the response elicited by the questions. Simultaneously with the expression changes seen in the enlarged image, the image of the seated Subject, 20, changes. The changes that occur in the image of the seated subject include, in addition to expression changes, shifts in posture and changes in the position of the head, arms, hands, fingers, legs, and feet. The changes are produced by a series of video vignettes representing the subjects body language. They may be produced graphically in the time-honored tradition involving artists drawing sequential images or through the use of contemporary tools such as computer animation. However, in the preferred embodiment, the vignettes are created by capturing the image of live actors responding to questions in specific ways under the supervision of a director following a script for a specific type of training. The specific types of training relate to interpersonal skills, such as interviewing people related to a crime, i.e., suspects and witnesses, interviewing potential employees, interacting with sales personnel, discussing critical issues with one's children and instructing on a one-to-one level are but a few of the potential uses of the invention.

The invention is realized by creating a plurality of video vignettes simulating a person responding to prepared statements by a user of the system or by the absence of a statement. In one embodiment, the prepared statements are presented as a list of options, one of which is selected by the user via standard highlighting techniques using the computer's cursor. In an alternate embodiment, the statements are verbalized by the user. This, of course, necessitates that the invention be executed by a computer incorporating voice recognition software. To allow latitude in framing a question or statement by users of the system, the prepared questions are recognized as combinations of keywords. Therefore, a prepared question is identified as such when phrased in a variety of different ways, the recognition criterion being the inclusion in the phrase or statement of the keywords. In the embodiments which eliminate the voice recognition requirement of the computer system supporting the invention, the prepared statements are selected by more conventional means such as typing a number or letter combination on the computer keyboard or, as previously suggested, highlighting the statement with a cursor.

The invention helps develop interpersonal skills. It does this by combining a plurality of audio responses and video vignettes simulating a person responding to prepared statements selected by the user. By properly choreographing the audio responses, video vignettes and prepared statements, the system may be used to train individuals for a variety of interpersonal situations. For purposes of explanation, the invention is presented as a training aid for suspect and witness interview techniques by law-enforcement personnel.

In a typical training scenario using the invention, the student interviews a simulated subject who is projected as illustrated in FIG. 1. (Throughout this presentation, the simulated subject will be referred to as Mike. This is for simplification and to personalize Mike in the same way the simulation is personalized for the user of the invention in the preferred reduction to practice.) The interview relates to, as an example in this instance, a crime. The purpose of the interview is to determine Mike's involvement. He may or may not have committed the crime. The student conducts the interview by selecting from an extensive, scripted list of questions residing in the software of the system and observing Mike's verbal and nonverbal responses. A stochastic model of Mike's personality selects responses to the student's questions based on logical and emotional factors associated with human behavior. Mike's behavior and responses are determined by a computer model of Mike's behavior (considered the "brain"). The computer model sequences the visual and audible responses which are presented by video characterizations as illustrated by FIG. 1. The video sequences are created for the software by using an actor. This provides a realistic, two-way conversational interview.

In the embodiment of the present invention being described as an example, a plurality of audio responses are created for articulation by the simulated person in response to the prepared questions which are selected by cursor, keyboard or vocalization by the user of the system or the absence of selection within a predetermined time period. The video vignettes and audio responses are further interrelated by a logic means which is created to reflect the personality of the simulated person. This personality profile emulation controls the video and audio responses according to an interrelated network keyed by recognition of the selected prepared questions by the computer running the programs of the invention. The personality profile emulation (personality emulator) is created as a logic means in the form of networks interrelating each of the audio responses with the video vignettes and the statements selected by the user as illustrated generally in FIG. 2.

Figure 2:
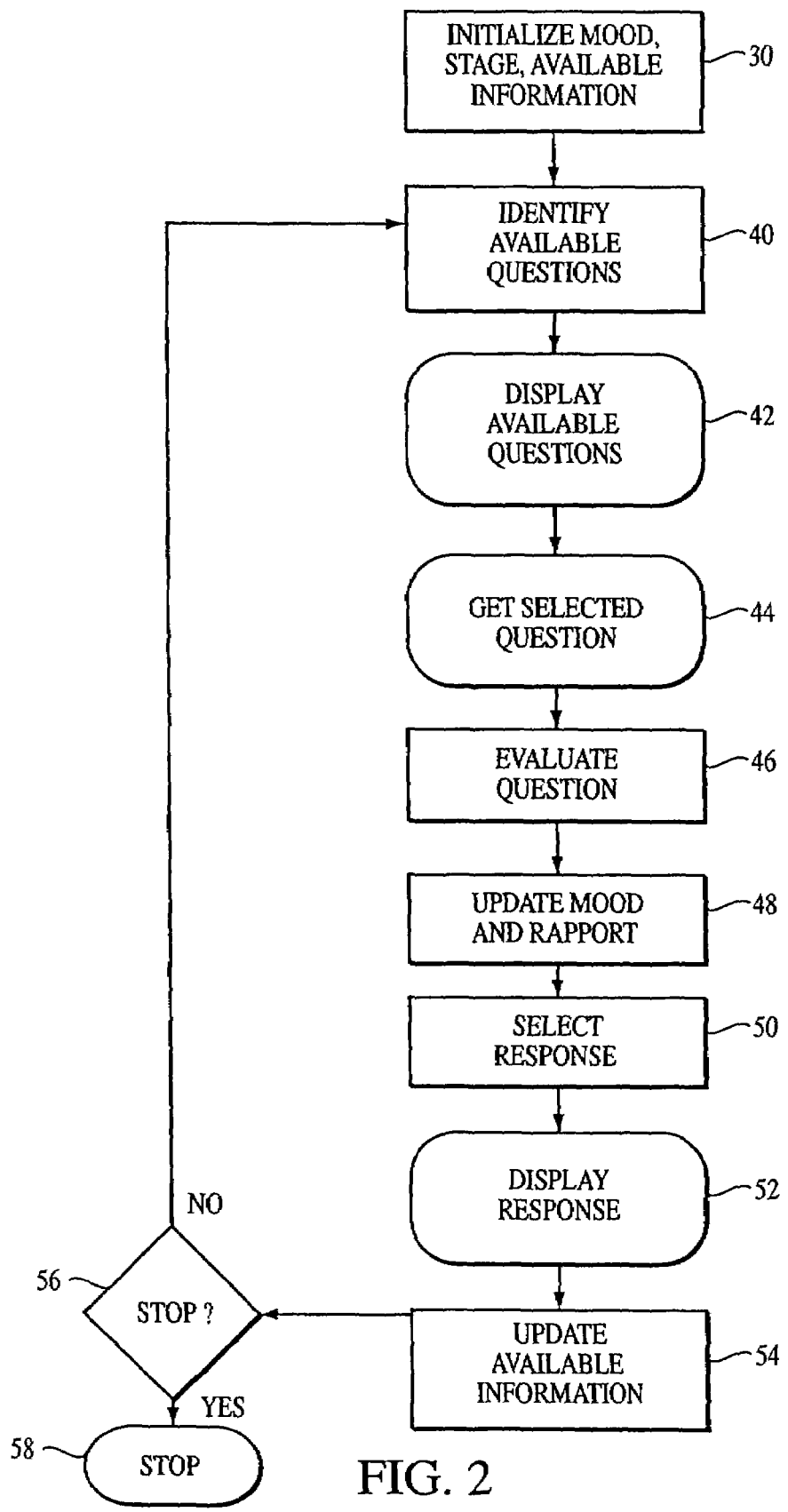
FIG. 2 is a simplified logic flow chart showing the means for accomplishing the modeling of a subject's behavior according to the present invention.

As shown in FIG. 2, the mood, stage and available information are initialized in step 30. Available questions are then identified in step 40 and displayed in step 42. A question is selected in step 44 and evaluated by the student interviewer in step 46. The software then updates the mood of the interviewee (Mike) in step 48 in accordance with the selected question. A response is then determined by the software in step 50 and displayed in step 52. The available information is then updated 54. The student can then choose to continue or stop the interview in step 56. The program stops in step 58 if directed or continues to step 40 if the student decides to continue.

Figure 3:
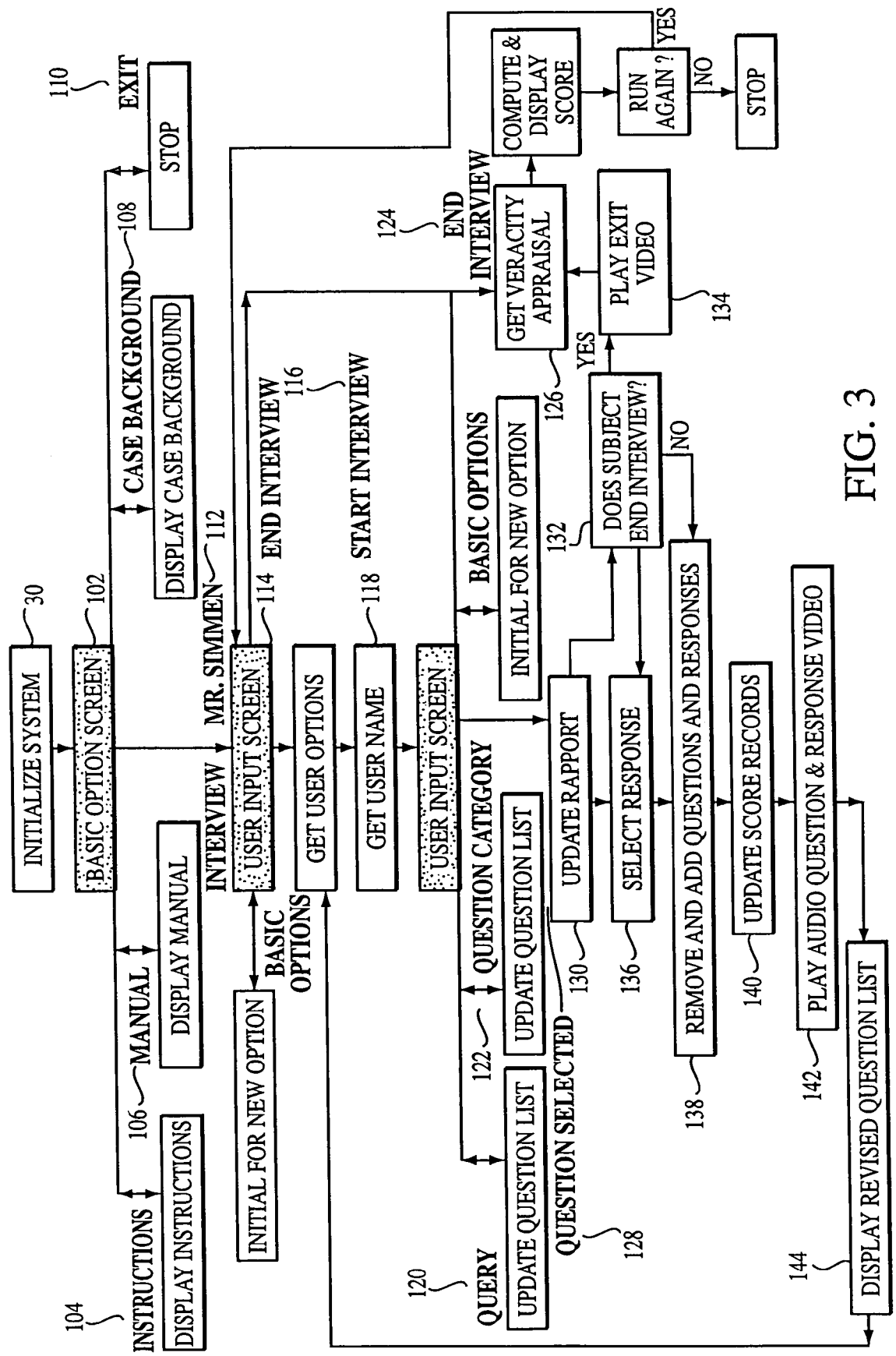
FIG. 3 is a detailed flow chart showing how the present invention operates.

FIG. 3 is a detailed flow chart showing how the present invention works. It should be noted, that many variations are available and this flow chart is given as an example of one way of achieving the present invention.

Figure 4:
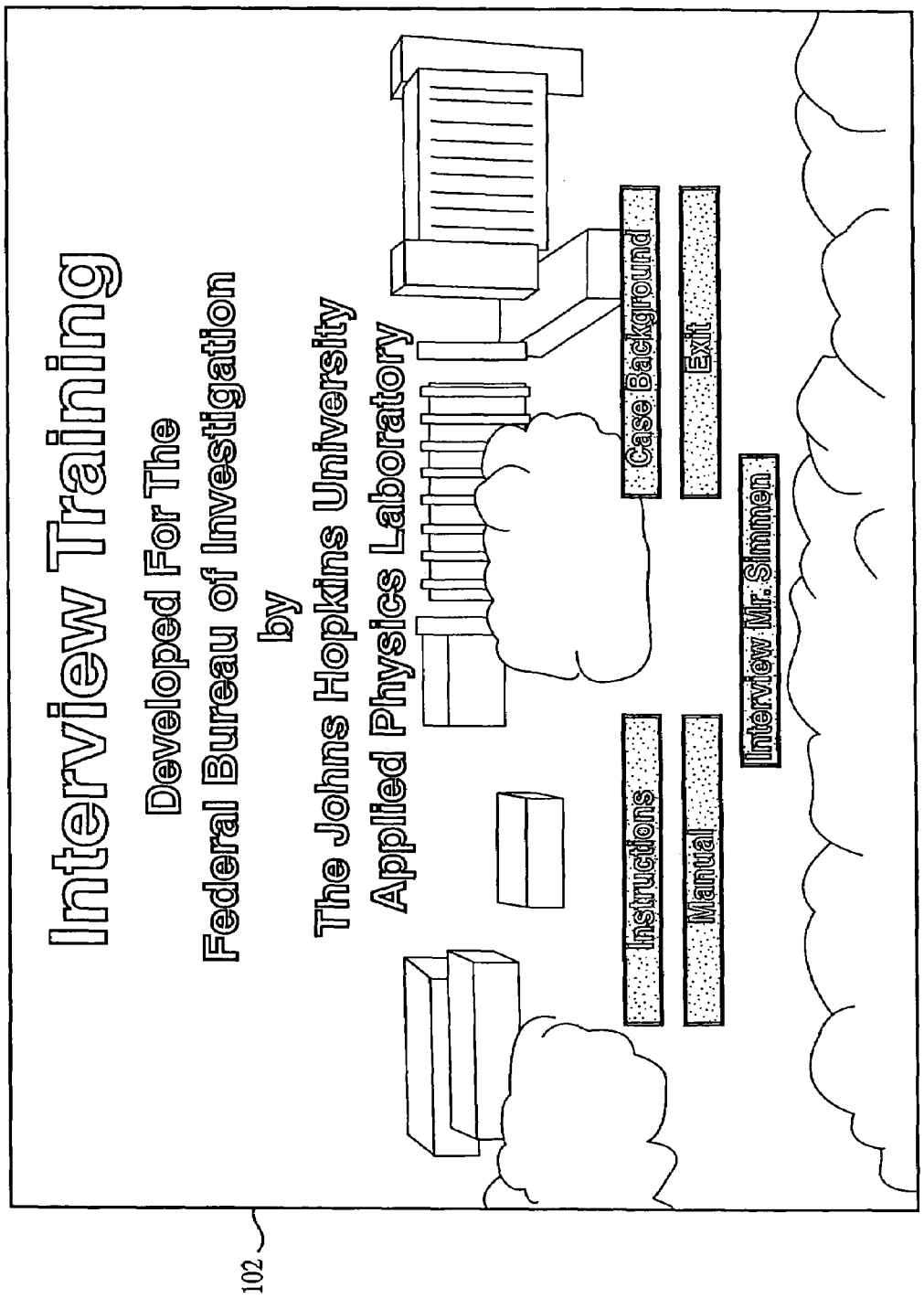
FIG. 4 is a computer display showing a "Basic Option" screen used in the present invention.

A "Basic Option" screen "pops" up 102 and the user can then select from any of five Basic Options on the opening screen shown in FIG. 4. These options include the selection of Instructions 104, Manual 106, Case Background 108, Exit 110, or Interview Mr. Simmens 112. The selection of Instructions 104, Manual 106 or Case Background 108 uses the web browser to display a text document. When the browser is closed, the Basic Option Screen (FIG. 4) reappears. The browser feature can be used to scroll through the documents or search for specific text. The Exit 110 option terminates the software.

If the Interview Mr. Simmens 112 option is selected, the interview is started by initializing Mike Simmen's guilt status and initial rapport level. The User Input Screen 114 shown in FIG. 5 then appears. This screen (FIG. 5) is the main control screen for the remainder of the program.

Before the Interview is initiated by selecting the "Start Interview" option 116, the user may chose to update some of the Basic Options 102 listed at the top of the screen or to "End Interview 110."

The "User Input" screen is shown in FIG. 5. When the user starts the interview, a window appears asking for the student's name. The "File" pull-down menu at the top of the User Input Screen allows a user to select from Basic Options including, but not limited to, the sex of the investigator's voice, the level of difficulty (few clues are presented at higher levels of difficulty), the sizes of the screen used to display the subject (in this example, Mike) and the option to inhibit the audio and video. The user may also ask for help in the "Help" pull-down menu and bring up the Instructions 104, Manual 106 or Case Background 108 using a web browser or read the copyright notice under the Rights pull-down menu. Once the interview is underway, the user may also choose to have the last question and answer repeated (Say Again pull-down menu), or replay the entire interview up to the last response (Playback pull-down menu).

Before any of the other options can be exercised, the user must start the interview. After providing a user name 118 or using a default name, the user may select from a list of Basic Options from the menu at the top of the screen, Query 120 for a certain question using a keyword, display questions in a Question Category 122, such as "ATM" or "Jones", End the Interview 124 or ask any question displayed in either a Follow-up Question category window on the screen or Possible Question category Window on the screen by double-clicking on it.

If the user selects "Start Interview" 116, he or she is asked to enter his or her name to accept the default name. After this is done, the name entered will automatically be associated with the score. The user may then put any keyword in the Query window and select the Query button. When this is done all questions with that word will be displayed in the Possible Question window on the screen.

The user may then select any Question Category 122 at any time and all available questions in that category will be displayed.

The user may elect to end the interview (step 124) at any time. If this is done, a window appears requiring the user to decide if the subject, Mike in this case, has committed the crime (step 126). The student's decision along with the quality of the interview are used to calculate and display an interview score.

Once a question is selected (step 128), then a number of steps are required. Clue indicate status fields are used to judge the student's appraisal (veracity) (step 126) of a previous response (if one exists) as the evaluation records are updated. Information associated with the selected question is used to update the rapport (step 130) and the interview evaluation. If rapport is too low, the subject ends the interview (step 132) one of a number of videos is played (step 134), and the program proceeds as though the interview was terminated by the student. Otherwise a response is selected by building a probability model and using a random number to select one response (step 136) from the list of available responses. The entire list of available questions and available responses are updated (step 138) to avoid redundancies and inconsistencies and to allow for newly relevant questions and responses to be added to the list of possibilities. The student score is then updated (step 140). The question and response are then played (step 142). Finally, the revised question list is displayed (step 144). The software executes each of the student's commands and then waits for the next command.

To use the invention, the student carefully listens to and observes Mike's responses. It should be noted that every time the system is exercised, the subject (in this example, Mike) behaves differently. This is due to the fact that random numbers drive the subject's behavior. The student plans a line of questioning based on his interpretation of the responses and judges the content as truthful, deceptive, or not informative. The simulated subject's response and behavior depend on the student's input. Because most questions have several possible responses and the simulated Mike may or may not be guilty during a simulation, the interview proceeds differently each time it is conducted and the subject behaves realistically and unpredictably. Like a real interview, the simulated interview is expected to take over an hour, but can take as little or as long as required. A properly conducted interview would take over an hour.

The model for Mike's behavior includes specific attributes that help the user develop interview skills. Mike "remembers" the nature of the interviewer's questions and statements and responds based on typical behavior patterns related to his guilt or innocence and content of the interview. The logical component within the system tracks the responses and keeps them reasonable and consistent. The operational program of the system selects one of a series of likely responses considering the question and circumstances, which are affected by Mike's status (e.g., guilt or innocence) and his emotional state.

Mike's emotional component is critical in the selection of the response to a question. His emotional state is determined primarily by the student's questions. A mathematical model determines the flow of Mike's emotions as questions are asked and responses are given. The model parameters can be adjusted to affect Mike's personality. The emotional model can be tuned so that Mike may be forgiving of a poorly worded question, or may be easily upset and slow to forgive blunders made by the questioner.

The logical component of Mike's brain is saved in a database. It contains all available questions and all possible responses to those questions. Different questions can share responses, and each question can have many responses, so that data fields written into the database are used to link questions and responses and to generate sub lists of potential questions to be asked for a given progression of the interview.

In a preferred embodiment, there are over 500 possible questions that can be asked in almost any order. To reduce the search for the desired questions, those that have been asked are eliminated from the list. Also, similar questions are deleted. As replies are provided, new information is revealed and new questions become relevant and available. Fields in the database (logical component) are used to identify which questions and replies are opened and closed as a result of each question and Mike's reply.

The program implementing the invention makes sure Mike's replies are consistent. For example, suppose Mike is asked if he likes his supervisor and he replies, "She's okay." If the next question is "Do you ever socialize with her?" the reply "No, I can't stand her." must be dropped from the set of possible responses. In other situations, a different or inconsistent reply is required. For example, if Mike is asked, "What do you like to do in your spare time?", he may reply that he plays golf where the possible replies are that he plays golf, reads, or skis. If he is then asked, "What else do you like to do?", the golf reply is a consistent reply, but must be dropped.

In a preferred embodiment, Mike will be in any one of at least five emotional states. The states are five levels of rapport, including worst possible, poor, average, good, and excellent. As rapport deteriorates, Mike provides short uninformative replies, while with better rapport, Mike provides more complete and revealing replies. For another application, the states could be anger, denial, depression, bargaining, and acceptance and Mike would respond accordingly. Mike moves through his emotional states as a result of the interactions with the student.

Each question is coded in accordance with its effect on Mike's emotional state. The code is rapport-dependent and defined in Table 1.

TABLE 1

Rapport State Definitions

| Rapport State | Description |
| --- | --- |
| 1 WORST | Rapport is very bad and little information will be provided. Answers are as short and as uninformative as possible. Hostility should be clear. |
| 2 BAD | Rapport can change with work. Most responses are brief. Hostility is there, but not real obvious. The main sign of this state is short, uninformative answers. |
| 3 NEUTRAL | Mike's demeanor does not change. Gives a mix of both vague and informative answers. Behavior commonly used when first introduced to a new person. |
| 4 GOOD | Mike has some trust and respect for the investigator and is generally forth coming. A behavior often reserved for an acquaintance of some time. |
| 5 EXCELLENT | Mike sometimes volunteers information. He feels he can talk to the investigator. Relationship is warm, friendly and almost trusting. Behavior of the kind of person that may want you as a friend. |

When the interview is initiated, quantitative emotional values are allocated to each of the five rapport states, and these values are constrained to add up to 1. The questions act as stimuli to affect the flow of these emotional values from state to state. The model of the emotional flow is complicated, yet can easily be modified to accommodate changing requirements. For Mike, the model modifies itself as the interview progresses. For example, each time you irritate him (rapport state deteriorates), he is progressively more easily irritated.

Mike's state is the rapport state with the largest emotion value. The emotion model performs two fundamental functions: (1) it determines the direction of emotion flow, and (2) it determines the magnitude of the flow. As questions are asked, the model determines how the emotions flow towards a target rapport from all other rapport states. The flow continues until either the emotion limit for that state is reached or the sign of the emotional stimulus, Sr is changed. If good questions are being asked, Sr is positive, and when the flow reaches the limit, the next rapport state is selected using a matrix of transition probabilities to select the next target state. This matrix is called the forward transition matrix. If Sr is negative, then a different transition matrix, called the backward transition matrix, is used to select the next target state. For the preferred embodiment, flows of emotion toward an improved rapport are positive and those toward a weaker rapport are negative. The sign of Sr determines the direction of the flow. If the sign changes as questions are asked, the direction of the flow immediately changes and a new target rapport is selected. The target rapport selected is usually the next higher or lower state depending on the sign of Sr, but that is not a requirement. For this embodiment the forward transition matrix usually selects the next higher rapport level. However, the backwards transition matrix may skip the next lower state. Thus, poor questions usually cause rapport with Mike to deteriorate faster but can cause the interview to suddenly turn sour.

The stimulus Sr, is computed using rapport values associate with all of the previous questions and provides the input to this model. A rapport value is associated with each question and a value between 0 and 9 with a 0 being associated with very poor questions and 9 with the best possible question. The rapport value is first converted into a rapport value between −4.5 and +4.5. Negative values represent poor question selection. After each question, the stimulus value, Sr, is computed using the average rapport value of all previous questions and the current question rapport value, $S_q$, as follows:

$$S_r = 0.8[\text{memory}*S_{r-1} + (1-\text{memory})*S_q] + 0.2(\text{average rapport value}). \quad (1)$$

In this equation, $S_{r-1}$ is the stimulus before the last question. The memory quantity in the equation is a parameter that can be tuned to change the behavior of Mike and is nominally set to 0.45 in a preferred embodiment. This parameter controls the influence of the last question of the stimulus. The stimulus is influenced most by the value of the last question, but the most recent history and the entire history also influence it.

The memory constant described is exemplary of several parameters that allow Mike's personality to be tuned. The limit of emotions in a state before another target rapport state is selected is determined separately for each state. These five state-related parameters are used to make it difficult to move away from some states and easy to slip from others.

Another state-related set of parameters affect the rate of emotion flow. These parameters reflect a "stickiness" factor and make it difficult or easy for the emotions to flow from particular states. This parameter determines the portion of a rapport state's emotion that is allowed to flow from that source to a target state. A sticky state yields less to the target state, i.e., the more "sticky" the less likely the rapport state will change.

Two parameters that affect all of the states are the forward and backward speed parameters. These speed factors provide a direction dependent way for the developer to regulate the speed of the flow of emotions that affects all states equally. For the preferred embodiment, rapport is slow to build and can be destroyed rapidly with a few poor questions, the forward speed (improved rapport) is much slower than the backward speed (deteriorating rapport). These two parameters, like the majority of parameters that make up Mike's "brain", may be varied to change Mike's personality.

Figure 6:
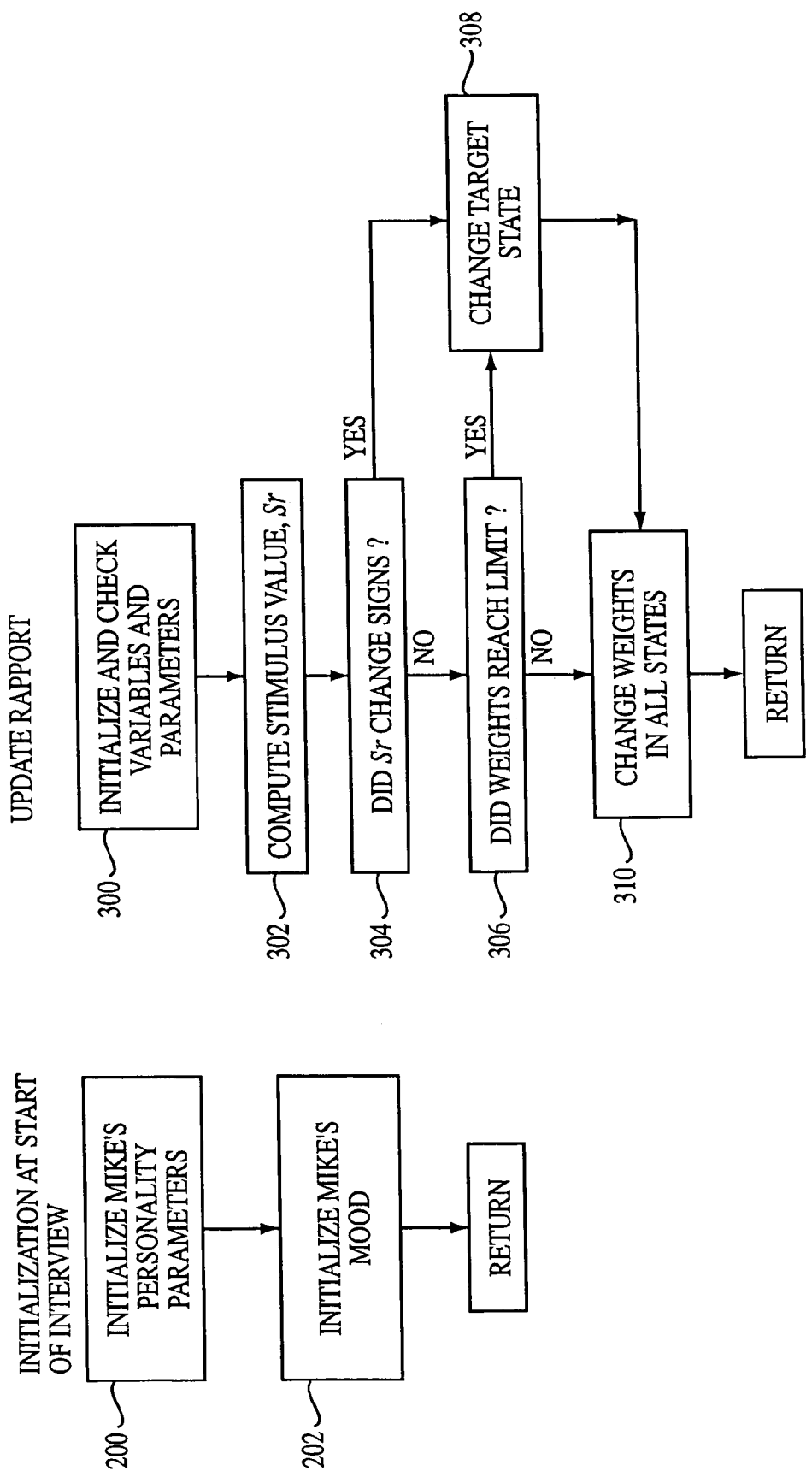
FIG. 6 is a flow chart showing how rapport is modeled according to the present invention.
Figure 7:
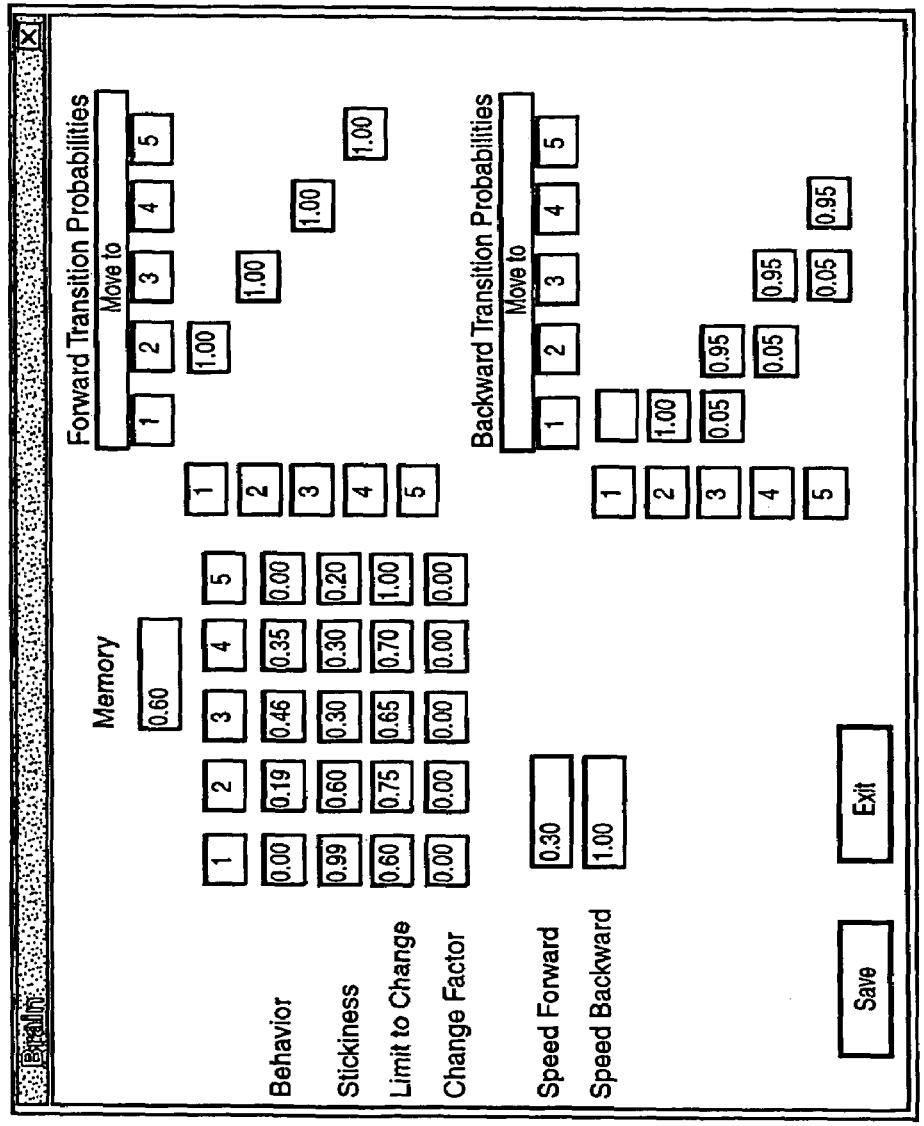
FIG. 7 is an exemplary image of the control panel screen for understanding rapport states according to the present invention.

Mike's emotional "brain" is altered by varying parameters such as the "stickiness", thereby varying Mike's personality. This is accomplished through a specialized input control screen shown in FIG. 6. The software for modeling and tracking a subject's rapport, in this case Mike's, is unique. It includes initializing the rapport routine when the interview starts and updating the rapport (step 130 in FIG. 3). The rapport routine is updated and run after each question. The initialization routine in FIG. 6 initializes Mike's personality parameters (step 200) including rapport state transition probabilities, the limit before transition to another state memory and state "stickiness". Further, a pseudo random number generator is used to set Mike's initial rapport by assigning weights to each state. FIG. 7 shows an example of the rapport states and related information. Most of the initial weight is assigned to rapport states 2 and 3 in this example.

The rapport state with the most weight, state 3 in FIG. 7, is defined to be Mike's mood (step 202 in FIG. 6) or rapport state. Each time there is a stimulus of a question, the Update Rapport routine in FIG. 6 is called to cause the weights to flow toward a target state. Most often this routine will simply take weight from other states and place them in a target state. Sometimes the routine will select a new target state. Step 300 initializes and checks variables and parameter. The rapport value associated with the selected question is normalized to provide a value between −0.5 and +0.5. This value, the current stimulus value, $S_{r-1}$, and the average question value for the entire interview are used to compute the new stimulus value, $S_r$ (step 302). The new stimulus value $S_r$ is checked to see if its sign has changed (step 304). If the sign of the new stimulus does not change or if the "limit to change" of the weight in the target state has not been reached (step 306), the target state is not changed. If, however, either one of these conditions is met, the target state is changed (step 308) using either the forward or backwards transition matrix.

If the sign changes from positive to negative, or if the limit for the target state has been reached and the stimulus is negative, the backwards transitions are used to select the next target state. For the transition in matrices FIG. 7, the forward transition is always to the next higher state, but a backward transition can be either to the next lower state or may jump two states down. When the limit of the state (1.0) is reached and the stimulus is negative, the interview is terminated.

Once the target state is determined, weights from each of the other states are moved to the target state. To determine the amount of weight taken, one minus the "stickiness" factor is multiplied by the normalized question rapport score and the weight in the state, creating a change factor. This factor is multiplied by a speed appropriate (forward or backward) factor to determine the total weight to be moved to the target state. Once the weights are changed (step 310), the update is complete and the program returns to its query state.

FIG. 8 shows an exemplary control panel screen used to input the subject's personality parameters into the fundamental program of the invention.

The present invention allows the developer to adjust the emotional model for the subject to meet the requirements of the training system being developed. In addition the software can adjust these model parameters. For example, Mike's personality can be modified as part of the initialization of the program. For the preferred embodiment, each time Mike enters rapport states 1 and 2, parameters are adjusted so he more easily is angered. The feature of allowing the emotional model to modify itself adds important richness to the model and makes Mike's behavior more like a real person.

When the interview begins, Mike is randomly assigned a number of initial conditions and these initial values are used to select responses from the database according to imperatives of the "brain". He may be guilty or innocent. If he is guilty, he could be motivated by need or hate. His initial rapport with the interrogator is randomly assigned with most of the emotion being assigned to the bad and neutral states. The selection of his guilt status affects his behavior throughout the interview. The student must identify and improve the rapport while determining Mike's guilt.

Mike's replies are selected from the logical portion of his brain using his rapport state, his guilty status, and a pseudorandom number generator. For each guilt status and each rapport state, interface fields in the logical database provide likelihood's of each response. These likelihood's are numbered between 0 and 9 and are used to develop probabilities associated with the available responses. When a question is asked, the likelihood's for all available replies for Mike's current state and status are summed. Each likelihood is divided by the sum to produce a series of probabilities for the available replies. These probabilities and a pseudorandom number generator are used to select Mike's response. Different likelihoods are assigned for each of the different guilt states and different rapport states.

The most significant part of the training simulation provided by the invention focuses on experience with a single case, where the student works through the steps of an interview. At each step, the student is given an opportunity to make mistakes. Each time the system is used, the simulated subject, Mike, provides different responses, sometimes subtly indicating truthful behavior and at other times indicating deception, motivated either by revenge or financial need.

The goal of the invention is to simulate a real interview by interweaving a plurality of video vignettes of a personality with questions and responses. In this embodiment, due to technology at the present time, the possible questions and responses are limited to those planned as the script incorporated into the program was developed. However, there is a set of standard questions that provide important diagnostic information and one goal is to familiarize the student with these questions. These questions are included in the script, which offers a reasonably rich variety of questions, giving the student the opportunity to practice question formulation. Even though the questions may appear limited, there are still hundreds or thousands available, making it possible to provide paths representing many realistic interview scenarios. Finally, responses depend on how well the student has laid the foundation for the questions, making rapport development an essential part of the successful simulated interview.

In the present example, there is a perceived lack of spontaneity and realism in the simulated interview. The student must somehow input or select the desired question while Mike waits. (The video presentation is frozen at the end of Mike's response to each question.) However, the delay does give the trainee time to think and to develop better habits. Of course, as technology advances, so will the interactions so that they can appear in "real time".

As the interview proceeds, the student learns to determine when it is appropriate to ask certain questions while watching and listening for indicative responses. If and when the student feels that Mike is the likely perpetrator of the crime or will provide no new information, the student can terminate the interview or suggest that the interview end. At that time, the student is asked to fill out a short on-screen questionnaire that forces the user to make a decision on the question of Mike's honesty.

As noted above, when the executable program of the invention is started, the user can select one of a number of options. The first is an on-line manual (106), which can be called up and read or printed. Mike acts out many different behaviors described in this manual. The user may also select a "User's Guide" (104) and learn how to use the software and be provided with hints for a better interview. He or she may select "Background" (108), to learn the basic case information. Finally the user may select "Interview Mr. Simmen" (112), to start the interview.

The interview option allows the user to ask questions by selecting them in any of a number of ways. The student may enter a key word, which brings up a list of questions containing that word. The user may page through a list in any one of at least 14 different categories. As the give and take between the user progresses, the system provides a list of follow up questions and statements in the Follow Up window. These questions are obvious follow up questions consisting of both good and bad questions or statements. They are provided to help avoid making the user dig through a long list of questions to find the next obvious question. Some of the follow up questions only make sense at that point in the interview and will disappear after the next question is asked. These questions are marked with an asterisk (*).

Sometimes Mike may ask the student a question, in which case the student may choose to ignore the question or respond using a reply in the follow-up window. The student may also elect to make supportive statements, helping to build rapport. These statements are made available throughout the question list at appropriate times. A critical part of the system is to provide easily available bad questions. Poor student performance ratings and information restrictions result from the use of the bad questions. Many students will select poor questions to see how Mike responds and observe how his responses differ. This experience also adds to the training.

In the scenario used herein to demonstrate a preferred embodiment of the invention, the student is investigating the theft of $43,000 from an Automatic Teller Machine (ATM) at a bank. The subject of the interview, Mike, is a male loan officer who had the opportunity to take the money.

The example interview begins as illustrated in the logic flow diagram shown in FIG. 2, which includes the primary question loop, 40, which is reiterated for each question. Mike is initially assigned any one of three guilt states before the first question loop begins (step 30). The guilt states are:

Truthful (innocent), guilty and motivated by Revenge, or guilty and motivated by Financial pressure (states T, R, and F, respectively). The student investigator has several possibilities to explore, including revenge for being passed over for promotion, financial pressure caused by a series of events, problems with alcohol, problems with drugs, problems with gambling or problems with a girlfriend. The innocent subject also has all of the same motives, but demonstrates a different pattern of responses to other critical questions.

The system remembers the sequence of questions and responses from the interview so that when the interview is ended, the user can replay it. During replay, the system stops at the end of each response. Unusual behaviors, if any, are identified in text form on the screen during the replay but not during the original interview. For example, a change in voice or an unusual movement may be noted. By design, some of the behaviors are subtle and a few are misleading.

The steps involved in producing the scenario specific parts of the invention include the development of the master list of questions and a corresponding list of potential responses. Next, a storyboard is created to demonstrate screen formats and the integration of the modeling of the questions and responses. A voice synthesizer is used so that an audio only version of the system can be thoroughly tested. Recording the vocalization ("voice over") of the questions follows this. Finally the actor is used to gather the multitude of video segments. Once taped, the segments are carefully edited before being digitized. Then the hours of video and audio data are compressed for available media. For each usable response, key start and stop frames are identified in the video stream and integrated with the audio questions so that the responses are seamless and timely.

The goal of the script for the invention is to make Mike behave realistically and unpredictability, while allowing the student to ask a wide variety of questions. Even if the student detects significant clues early on, it may be useful to continue the interview to identify interrogation themes.

The interview script, which customizes the basic fundamental program of the invention to render it applicable to an end task, consists of all available questions and responses. Both verbal and nonverbal behaviors are described for each of over 1200 responses in preferred embodiments. When an interview is initiated, a large number of the questions, 41, are made available to the student. All of these will make sense. Some of the other planned questions will not be revealed because specific information has not yet been developed or because they may imply information that would not realistically be available. These questions are not made accessible to the user until the appropriate information is revealed. As certain information comes to light, some questions may no longer make sense or the available responses may not make any sense. These questions will be removed. After any question is asked, it and similar questions are removed from the question list.

The logical part of Mike's "brain" consists of the questions/statements and the associated codes and the list of responses and the associated codes. A most important feature of the system is these associated modeling codes contained in the script. For each question, there is a list of key words, a question code, a rapport value, and an diagnostic value that is incorporated as part of question scripting shown in Table 2.

TABLE 2

Sample of a Scripted Question.

| Question/Statement | Question Code | Rapport Value | Diagnostic Value | Close QST | Section Key words |
|---|---|---|---|---|---|
| Do you think the person who did this had a good reason? | 774 | G | 9 | 775 | Indicator |
| Of all the possible reasons you can think of for taking the money, which one would be the most likely? | 775 | G | 9 | 774 | Indicator |

The Question/Statement/column of Table 2 provides question text for the student investigator. This text may be a basic question, a statement made in response to Mike's reply or a response to Mike's question. The question code is used by the software to identify the text and to match it to the possible responses. That is, the questions are assigned a number and the answer is assigned a matching number.

The responses given to each question depend on the rapport between the subject and the student. The rapport is determined by the emotion model and uses the rapport value associated with each question to determine the flow of the emotions. As a result, each question is rated according to its rapport value as shown in Table 1. Certain questions or comments improve rapport, even while being of little value in providing information or improving the diagnostic information. The Mike-student rapport depends on the history of the interaction, the rapport just before the question and the last question asked. Thus, the sequence of selection of the statements asked is important.

The value may be rapport-dependent, so that a question may be a good choice when rapport is good or excellent and a bad choice when rapport is poor or the worst. Therefore, the codes in Table 3 are provided that allow the script to specify different values for the questions, depending on the rapport. Four codes (P, A, G, B) are provided. Their names indicate the states when the question should be asked. A "P" indicates that this question is excellent when rapport is POOR and needs building, but is a waste when rapport is good. An "A" question is valuable with AVERAGE rapport, but is not particularly useful with very poor or very good rapport. A "G" question is productive in rapport states 4 or 5 when rapport is GOOD, but the rare "B" question is BEST when rapport is in either state 4 or 5. The developer of the system may provide a factor for scaling these codes. For example, the user may enter (0.5.) P to use half of all the rapport values or use (1.5)P to increase all the values to either their limit of 9 or by 150%.

TABLE 3

Question Value Functions Dependant on Rapport State

| | Question Values | | | | |
|---|---|---|---|---|---|
| Rapport Function | Rapport State 1 | Rapport State 2 | Rapport State 3 | Rapport State 4 | Rapport State 5 |
| POOR | 8 | 8 | 4 | 3 | 3 |
| AVERAGE | 2 | 3 | 6 | 4 | 4 |
| GOOD | 1 | 2 | 4 | 5 | 6 |
| BEST | 0 | 2 | 3 | 7 | 9 |

When the rapport is poor, Mike will provide short answers with much less information. When it is high, Mike is more likely to provide more valuable information. The rapport score is used to determine the rapport state. In writing the script, special care is given to provide the student periodically with evidence of the rapport level. The student needs to be able to identify deteriorating rapport and have dialog available, which improves rapport.

Some questions may hurt rapport or irritate Mike, but will provide useful information and perhaps assist in the detection of deception or identify the motive. Therefore, each question is also rated according to its diagnostic value which is the primary factor in determining the question value. The diagnostic value is influenced by the rapport value. At the end of the interview, these question diagnostic values are combined to produce a diagnostic score used to evaluate the interview. Again, the sequence of selection of the statement helps establish a performance score for the user/student. If a sequence of statements are selected with the appropriate rapport, the diagnostic (performance) score will be enhanced. If the rapport state is poor, the same questions will result in a lesser score. Table 4 describes how these Question diagnostic values are determined.

TABLE 4

Question Diagnostic Value Definitions

| QUESTION VALUES | DOES IT HELP RAPPORT? | DOES IT IDENTIFY MOTIVE? | DOES IT HELP DETECT DECEPTION | MEANING AND COMMENTS |
| --- | --- | --- | --- | --- |
| 0 | No | No | No | As poor a question as any provided; insulting, creates dislike and all but destroys trust. It may appear to Mike that the investigator is out to get him whether he is guilty or not. |
| 1 | No | Unlikely | No | Poor question, Mike loses respect for student investigator. May make this student investigator look stupid or foolish or possibly out to get Mike. |
| 2 | No | Unlikely | No | Poor question generally. Could make investigator look arrogant or foolish |
| 3 | No | Possibly | No | Sensitive people may take offense, but most would not |
| 4 | Slight negative | Possibly | Unlikely | Clerical question, sometimes leading to potential motives. Asked in a better way. |
| 5 | A little | Possibly | Neutral | May be necessary, clerical, opens dialogue. The weakest question the world's best examiner would ask. |
| 6 | Possibly | Yes, most likely | Possibly | Perhaps a necessary follow-up question. The kind of question you are glad you asked, is designed to improve at least one of Rapport, Motive or Detection of Deception, with little loss. |
| 7 | Possibly | Yes, most likely | Yes, most likely | Provides diagnostic information and asked at a reasonable time. Probably improve one or more of, Rapport, Motive, Detection of Deception. |
| 8 | Yes, most likely | Yes, most likely | Yes, most likely | Provides significant diagnostic information when asked at the correct time. Probably improves two of Rapport, Motive, Detection of Deception. |
| 9 | Yes, most likely | Yes, most likely | Yes, most likely | Provides significant information. May also improve all three of Rapport, Motive, Detection of Deception |

If the student consistently asks good questions, that information produces a high overall evaluation of the student's technique. The student still must be able to recognize the clues and determine if Mike is deceptive or truthful to get the best evaluation.

Sometimes when Mike answers a question, that question and other questions will be answered. In order to reduce the number of questions the user must search through to find the desired questions, and to help insure consistency in answers, similar questions are dropped from the list of available questions. The "Close Question" column in Table 2 identifies those operations closed as a result of asking the question.

To make the question selection easier for the user, most questions are associated with one or more of 14 categories. When the user selects a category all questions associated with that category are displayed in the question window. The final column in Table 2 contains key words that are used to identify categories associated with the questions. Some questions are associated with several categories. For example, the question "How much money was your wife making" would fall into the Personal, Financial and Family categories. Other questions are not associated with any category, so no key word is provided. These are opened by one of Mike's responses. For example, when Mike ask, "How are you?" the reply "Fine, Thanks" is not associated with any category and is only available immediately after Mike's question.

For each question or comment, there is a series of possible responses. Table 5 provides example responses with associated codes. Each response requires 8 columns of information or codes.

when Mike is in the corresponding guilt state and a 0 indicates that it can not be used. For example, 111 indicates that the response can be given by Mike with any guilt state while 010 indicates that the response can only be used when Mike has a Revenge, "R", guilt state and not with a Truthful "T" or a Financial, "F" guilt state.

Some nonverbal responses may be a result of stress or habit. For example, Mike may nonverbally express stress by tucking his chin, maintaining extended eye contact, and covering his mouth. His speech may slow or his voice soften. These behavioral clues include voice pitch, and clarity of speech as well as head, eye, hand, arm, and leg movements. If these behaviors only occur when certain topics are discussed, then the investigator should be aware that such topics are sensitive and may require more discussion. The "Response Indicator" column of Table 6 identifies clusters of behavior often associated with deception. They are used in the production to tell the actor how to present the response. A cluster consists of several simple behaviors that occur in a short interval. These will be used by the student to help detect deception. Table 5 shows how the simple behavioral codes are combined to form the clusters and these

TABLE 5

Sample of A Scripted Response

| Reply Code | Available to | Response | Question Open? | Guilt TRF | Response Indicator | Deceptive Rapport | Truthful Rapport |
|---|---|---|---|---|---|---|---|
| 774 | 774 | Some people just don't need reasons. They take advantage of every situation and only worry about themselves. | 775 | 100 | | 00101 | 00349 |
| 775 | 774 | Maybe they thought that they had a good reason, but there's really no good reason for someone to be a thief. | 775 | 111 | | 00011 | 00244 |
| 776 | 774 775 | They probably needed the money to pay bills or something like that. | | 111 | all | 00059 | 00000 |
| 777 | 774 775 | Maybe the person wanted to teach the bank a lesson about tightening up security. | | 010 | H4 | 00049 | 00000 |
| 778 | 774 | Who knows what reason they had. | 775 | 111 | | 99964 | 98420 |
| 779 | 774 | Only God and the person who did it know why they did it. | 775 | 111 | C2 | 12334 | 10100 |
| 780 | 774 | I don't know. | 775 | 111 | | 98660 | 98640 |
| 781 | 774 | I guess so, but I don't know why. | 775 | 111 | | 99999 | 99999 |
| 782 | 774 | I'd like to know the reason myself. | 775 | 101 | | 99999 | 99999 |
| 783 | 774 | Maybe someone needed some help. | 775 | 111 | | 00047 | 00010 |
| 784 | 774 775 | Probably drugs. | | 111 | | 22222 | 11111 |
| 785 | 774 775 | Someone probably needed some money; too many bills or something. | | 111 | | 00069 | 32222 |

In Table 5, the "Reply Code" column provides unique identifiers for each reply. The "Available to" column identifies the questions to which the reply can be given. The "Response" column contains the text of the reply. Sometimes, Mike asks a question or makes a comment that introduce new information requiring new questions. The "Question Open" column identifies Questions/Statements/Responses that are made available to the user as a result of the response. Often these questions/statements/responses are made available in the follow-up window.

The "Guilt TRF" column limits the use of the response to certain guilt statuses using the binary codes in the logical database. The order is: (1) Mike is Truthful, (2) Mike has a Revenge motive or (3) Mike has a Financial motive. A number 1 in the table indicates that the response can be used clusters are coded with a single code (C1, C2, . . . ). Simple movements are described in the script with a few of the behavioral codes while standard clusters have their own codes.

TABLE 6

Sample of Clusters Codes

| BEHAVIORAL CODES | CLUSTER CODES | DESCRIPTION OF BEHAVIOR |
|---|---|---|
| H4, A9, L1 | C1 | Chin projected, knitted "V" over nose, crossed legs (barrier) |
| H7, E9, A2, L9 | C2 | Jaw flexed, eyes "hard", finger pointed, feet hidden (under chair) |

TABLE 6-continued

Sample of Clusters Codes

| BEHAVIORAL CODES | CLUSTER CODES | DESCRIPTION OF BEHAVIOR |
|---|---|---|
| E9, AS, L1 | C3 | Eyes "hard", "L" thumb under chin, finger to eye, crossed legs |
| HQ, P4, A11, L3 | C4 | Head tilted, zero blink rate, arms crossed, fist(s) clenched, "Fonz" attitude (slouched, arrogant) |

A pattern of behavior for one individual being interviewed may be normal or just a sign of stress. For another individual that same behavior may only occur as s/he attempts deception. As part of a good interview, the student must identify the normal or baseline behavior for Mike. That behavior will differ from one interview to another, so the student must identify the baseline behavior for the particular interview s/he is conducting. To create this needed changing baseline behavior, many of Mike's responses are recorded five times using five different behavior patterns or clusters. As the interview is initiated, two of the five patterns are randomly selected for baseline behavior. These responses will be seen frequently in a properly conducted interview. The other three clusters will only be seen when and if Mike attempts deception. When Mike's reply contains one of these five clusters, it will indicate deception when it is not part of his baseline behavior and will not indicate deception when it is part of the baseline behavior. The student is taught to carefully baseline the subject's behavior in order to avoid mistaking normal behavior for deception.

In Table 5, in the Response Indicator column, the word "all" is used to indicate that five responses have been recorded for this reply. When this reply is used, Mike demonstrates one of the five behavioral patterns. If he is innocent, it will be a baseline behavior; if he is deceptive then it will be a non-baseline behavior only seen when he is lying.

The last two columns in Table 5, correspond to "Deceptive Rapport" and "Truthful Rapport." These columns contain likelihood codes used to determine how likely the response is and to compute the changing probability of the corresponding response. The probability depends on the rapport with Mike, his veracity and the likelihoods of the available responses at the time the question is asked. Each of the two columns contains a string of likelihood codes consisting of five digits between 0 and 9. The five digits correspond to the five rapport values. The first digit corresponds to the likelihood of worst rapport and the last digit corresponds to the best rapport. If the rapport state is 3 for a guilty Mike, the likelihood is found in third digit of the Deceptive column. If that response is common for Mike in state 3, the third digit of likelihood code would be assigned a 7, 8, or 9. If the response is unusual, that digit would be given a 0, 1, or 2.

Some of the possible responses may be eliminated because they are inappropriate for the guilt status or because they are inconsistent with other of Mike's statements. The likelihood codes from the possible responses are summed and then each is divided by that total to obtain a probability for each response. Finally, these probabilities along with a random number are used to select the response.

Other factors are used to evaluate the interview. These include the correct determination of Mike's status (truthful or deceptive) and the detection of clues. Some of Mike's replies reveal attempts to deceive and should be identified as an indicator of deception. Other replies are unusual for a deceptive person and indicate that Mike is truthful. In a typical interview, both types of clues will be observed, but most of the clues will reveal the truth. Points are awarded for the proper identification of all clues. A detailed description of the scoring algorithm follows:

1) If the student correctly determines that Mike is truthful they get 30 correct points. If the student correctly determines that Mike is deceptive (easier and more clues are provided), they get 20 correct points.

2) Take the average question diagnostic value for the best 20 diagnostic questions and the worst 20 diagnostic questions then calculate:

$$\text{Diagnostic Value Points} = 4*[(AVG\_Question\_Value\_Top\_20 - 4.5) + \{2*(AVG\_Question\_Value\_Bottom\_20 - 4.5)\}]$$

The rational for the 2 is to lose more points for asking bad questions than are gained for asking good questions. The use of only the 20 most extreme questions is to negate the effect of the neutral, routine questions.

3) For each follow up question with rapport value and question value greater than 5 add one point to follow-up points. In addition to rewarding the student for good questions, this rewards for a logical stream of questions.

4) For each clue correctly identified add 2 points to Clue Points; if no clue is present and student selects deceptive or truthful then loose 1 Clue Point. If Mike provides a deceptive clue and the student selects truthful then loose 2 Clue Points. If Mike provides a truthful clue and the student selects deceptive then loose 2 Clue Points.

5) Rapport Points=8*Average Rapport Value

6) Total Score=
Correct Points+
Diagnostic Value Points+
Follow-Up Points+
Rapport Points 7) If the student asked less than 100 questions and if the Total Score is greater than (0.8*Number Of Questions) then $$\text{Total Score} = (0.8*\text{Number Of Questions})$$

This last step prevents a high score for asking one good diagnostic question, one good rapport question and guessing the subject status. It rewards the student for taking the time to put the subject at ease and developing themes for interrogation.

The program has four levels of difficulty: (1) beginner, (2) intermediate, (3) advanced, or (4) professional. Fewer clues are provided at the more challenging levels. This is accomplished by multiplying the likelihood of responses containing clues by a factor greater than one for the beginner level and factors less than one for the advanced or professional level. When a question is selected, it is read before Mike responds, reinforcing the question and allowing the student to observe any delays in Mike's answers. Another option allows the user to have the questions read either using a female or a male voice. The system stores the sequence of questions and responses from the interview so that the entire interview can be replayed and reexamined. During replay, the system identifies and records any unusual behavior in Mike.

The invention allows modification or tuning of Mike's basic personality. This is accomplished by varying Mike's personality parameters through a specialized input control screen. Through this device, the model for the subject, Mike, is manipulated to meet the requirements of the user and the application. FIG. 8 illustrate the control panel screen.

The present invention is not limited to the above example. The apparatus, system and method of the present invention can be used in any area where interview training techniques or interview skill building are needed. Some other examples would include training doctors, nurses, etc., training case workers, "just say no" drug programs, teachers, etc. The method can be implemented not only on a computer system using a CD ROM, but can be employed via any electronic system, such as over the internet, DVD, etc.

Specifically, applications include training for clandestine drug lab raids, circuit room testing, cultural sensitivity training, EEOC and affirmative action training, drug education, law enforcement sensitivity to victims of crime, doctor interviews with patients, job applicant interviews, interview training for employees, social concerns such as foster care interviews, interactive training between officers and enlisted personnel and sexual harassment training, to name a few.

Of particular importance is the ability of these systems to quantitatively evaluate the user's skill by providing numerical results free from biases either for or against the person being evaluated. For example, a physician may need to achieve a certain patient interview skill level before being board certified. A law enforcement agent may need to achieve a certain skill level in dealing with the public before being promoted. A diplomat may need to be aware of cultural differences before being assigned to a post or an employee may need to demonstrate a skill in dealing with a problem employee before being promoted to management.

The present invention can also be applicable to computerized games involving interaction of the person in the game with players where computer is actually a player.

It should be noted that the invention covers systems which go beyond playing a video when a question is asked. The key is that each user input affects more than one response or video selection. Another key is that they (the videos) are tied together to simulate human responses.

The foregoing is considered as illustrative only of the principles of the invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention and the appended claims and their equivalents.

What is claimed is:

1. An interactive apparatus, comprising:
   a plurality of video vignettes simulating a person;
   a plurality of statements to be selected by a user of said apparatus;
   a plurality of audio responses for articulation by said simulated person; and
   a logic means for interrelating each of said statements to be selected by the user, said audio responses and said video vignettes, such that each of said statements can have a plurality of different audio responses and video vignettes associated therewith, said logic means comprising:
   an emotional component comprising an emotional model of said simulated person, said emotional model determining the direction and magnitude of change between a plurality of emotional states of said simulated person in response to said statements selected by the user thereby affecting the selection from a list of available audio responses and video vignettes of one of said plurality of audio responses and one of said plurality of video vignettes in response to user selected ones of said plurality of statements; and
   a logical component for tracking said audio responses and said video vignettes and determining said list of available audio responses and video vignettes that is consistent in light of previously selected ones of said plurality of audio responses and ones of said plurality of video vignettes, said logical component further assigning a probability to each available response on said list based on said simulated person's emotional state and, using said probabilities and a pseudo-random number generator, selecting one of said plurality of audio responses and one of said plurality of video vignettes from said list.

2. An interactive apparatus as defined by claim 1, further comprising means for establishing a performance score for the user of said apparatus as a function of a history of the selected ones of said plurality of statements.

3. An interactive apparatus as defined by claim 2, further comprising means for establishing a performance score for the user of said apparatus as a function of the sequence of selection of said plurality of statements.

4. An interactive apparatus according to claim 1, wherein said interactive apparatus is voice activated.

5. An interactive training method, comprising the steps of:
   creating a plurality of video vignettes simulating a person;
   creating a plurality of statements to be selected by a user of said apparatus;
   creating a plurality of audio responses for articulation by said simulated person; and
   creating logic means for interrelating each of said audio responses, said video vignettes and said statements to be selected by the user, such that each of said statements can have a plurality of different audio responses and video vignettes associated therewith, said logic means comprising:
   a logical component for tracking said audio responses and said video vignettes and randomly selecting an audio response and video vignette associated therewith from a list of available audio responses and associated video vignettes determined by said logical component to be consistent in light of previously selected audio responses and video vignettes associated therewith; and
   an emotional component comprising an emotional model of said simulated person, said emotional model determining the direction and magnitude of change between a plurality of emotional states of said simulated person in response to said statements selected by the user, said logical component assigning a probability to each available response on said list based on said simulated person's emotional state and using said probabilities to affect the random selection from said list of one of said plurality of audio responses and one of said plurality of video vignettes in response to user selected ones of said plurality of statements, said random selection causing said simulated person to behave unpredictably thereby providing realistic interactive training for the user.

6. An interactive method according to claim 5, wherein the user articulates the statements selected.

7. An interactive apparatus, comprising:
   a plurality of video vignettes simulating a person;
   a listing of a plurality of statements to be verbalized by a user of said apparatus;
   a plurality of audio responses for articulation by said simulated person; and
   a logic means for interrelating each of said audio responses, said video vignettes and said statements to be verbalized by the user, such that each of said statements can have a plurality of different audio responses and video vignettes associated therewith, said logic means comprising:

a logical component for tracking said audio responses and said video vignettes and randomly selecting an audio response and video vignette associated therewith from a list of available audio responses and associated video vignettes determined by said logical component to be consistent in light of previously selected audio responses and video vignettes associated therewith; and an emotional component comprising an emotional model of said simulated person, said emotional model determining the direction and magnitude of change between a plurality of emotional states of said simulated person in response to said statements selected by the user, said logical component assigning a probability to each available response on said list based on said simulated person's emotional state and using said probabilities to affect the random selection from said list of one of said plurality of audio responses and one of said plurality of video vignettes in response to user verbalized ones of said plurality of statements.

8. An interactive apparatus as defined by claim 7, comprising means for establishing a performance score for the user of said apparatus as a function of the statements selected from said plurality of statements verbalized by the user.

9. An interactive apparatus as defined by claim 8, comprising means for establishing a performance score for the user of said apparatus as a function of the sequence of verbalization of said statements selected from said plurality of statements verbalized by the user.

10. An interactive apparatus, according to claim 7, wherein said interactive apparatus is voice activated by articulating the statements to be verbalized.

11. An interactive training method, comprising the steps of:

creating a plurality of video vignettes simulating a person;
creating a plurality of statements to be verbalized by a user;
creating means for recognizing verbalized ones of said plurality of statements;
creating a plurality of audio responses for articulation by said simulated person; and
creating logic means for interrelating each of said audio responses, said video vignettes and said plurality of statements to be verbalized by the user, such that each of said statements can have a plurality of different audio responses and video vignettes associated therewith, said logic means comprising:

a logical component for tracking said audio responses and said video vignettes and randomly selecting an audio response and video vignette associated therewith from a list of available audio responses and associated video vignettes determined by said logical component to be consistent in light of previously selected audio responses and video vignettes associated therewith; and an emotional component comprising an emotional model of said simulated person, said emotional model determining the direction and magnitude of change between a plurality of emotional states of said simulated person in response to said statements selected by the user, said logical component assigning a probability to each available response on said list based on said simulated person's emotional state and using said probabilities to affect the random selection from said list of one of said plurality of audio responses and one of said plurality of video vignettes in response to user verbalized ones of said plurality of statements, said random selection causing said simulated person to behave unpredictably thereby providing realistic interactive training for the user.

12. An interactive system, comprising:

memory means including a plurality of statements;
memory means for video presentation; and
keyboard means for selecting one of said plurality of statements in response to a visual cue from said monitor means or an audio cue, said video presentation capable of being one of a plurality of video presentations possible in response to said selected one of said plurality of statements, said selection of said one of said video presentations being controlled by:

a logical component for tracking said video presentations and randomly selecting a video presentation associated therewith from a list of available video presentations determined by said logical component to be consistent in light of previously selected video presentations associated therewith; and an emotional component comprising an emotional model of a simulated person appearing in said video presentation, said emotional model determining the direction and magnitude of change between a plurality of emotional states of said simulated person in response to said statements selected by a user, said logical component assigning a probability to each available video presentation on said list based on said simulated person's emotional state and using said probabilities to affect the random selection from said list of one of said plurality of video presentations in response to said selected one of said plurality of statements.

13. A computer readable medium that stores a program for providing interactive training for a user, said program comprising:

means for creating a simulated person in a plurality of vignettes;
means for creating a plurality of statements to be verbalized;
means for recognizing verbalized statements;
means for creating a plurality of audio responses for articulation;
means for creating logic means for interrelating said audio responses, simulated person and statements to be verbalized, such that each of said statements can have a plurality of different audio responses and vignettes associated therewith, said logic means comprising:

a logical component for tracking said audio responses and said vignettes and randomly selecting an audio response and vignette associated therewith from a list of available audio responses and associated vignettes determined by said logical component to be consistent in light of previously selected audio responses and vignettes associated therewith; and an emotional component comprising an emotional model of said simulated person, said emotional model determining the direction and magnitude of change between a plurality of emotional states of said simulated person in response to said statements selected by the user, said logical component assigning a probability to each available response on said list based on said simulated person's emotional state and using said probabilities to affect the random selection from said list of one of said plurality of audio responses and one of said plurality of vignettes in response to user verbalized ones of said plurality of statements, said random selection causing said simulated person to behave unpredictably thereby providing realistic interactive training for the user.

14. A computer readable medium that configures a computer to perform an interactive training method, said method comprising the steps of:
   simulating a person in a plurality of vignettes;
   selecting statements to be selected by a user;
   articulating audio responses by the simulated person; and
   interrelating the statements selected by the user, the audio response and the simulated person, such that each of said statements can have a plurality of different audio responses and vignettes associated therewith, wherein said interrelating step comprises the step of using:
   a logical component for tracking said audio responses and said vignettes and randomly selecting an audio response and vignette associated therewith from a list of available audio responses and associated vignettes determined by said logical component to be consistent in light of previously selected audio responses and vignettes associated therewith; and
   an emotional component comprising an emotional model of said simulated person, said emotional model determining the direction and magnitude of change between a plurality of emotional states of said simulated person in response to said statements selected by the user, said logical component assigning a probability to each available response on said list based on said simulated person's emotional state and using said probabilities to affect the random selection from said list of one of said audio responses and one of said plurality of vignettes in response to user selected ones of said statements, said random selection causing said simulated person to behave unpredictably thereby providing realistic interactive training for the user.

15. An interactive apparatus comprising:
   a means for simulating a person in a plurality of vignettes;
   a plurality of statements to be selected by a user of said apparatus;
   a plurality of audio responses for articulation by said simulated person; and
   logic means for interrelating each of said statements to be selected by the user, said audio responses and said simulated person, such that each of said statements can have a plurality of different audio responses and vignettes associated therewith, said logic means comprising:
   a logical component for tracking said audio responses and said vignettes and randomly selecting an audio response and vignette associated therewith from a list of available audio responses and associated vignettes determined by said logical component to be consistent in light of previously selected audio responses and vignettes associated therewith; and
   an emotional component comprising an emotional model of said simulated person, said emotional model determining the direction and magnitude of change between a plurality of emotional states of said simulated person in response to said statements selected by the user, said logical component assigning a probability to each available response on said list based on said simulated person's emotional state and using said probabilities to affect the random selection from said list of one of said plurality of audio responses and one of said plurality of vignettes in response to user selected ones of said plurality of statements.

16. An interactive training method, comprising the steps of:
   simulating a person in a plurality of vignettes;
   creating a plurality of statements to be selected by a user of said apparatus;
   creating a plurality of audio responses for articulation by said simulated person; and
   creating logic means for interrelating each of said audio responses, said simulated person and said statements to be selected by the user, such that each of said statements can have a plurality of different audio responses and vignettes associated therewith, said logic means comprising:
   a logical component for tracking said audio responses and said vignettes and randomly selecting an audio response and vignette associated therewith from a list of available audio responses and associated vignettes determined by said logical component to be consistent in light of previously selected audio responses and vignettes associated therewith; and
   an emotional component comprising an emotional model of said simulated person, said emotional model determining the direction and magnitude of change between a plurality of emotional states of said simulated person in response to said statements selected by the user, said logical component assigning a probability to each available response on said list based on said simulated person's emotional state and using said probabilities to affect the random selection from said list of one of said plurality of audio responses and one of said plurality of vignettes in response to user selected ones of said plurality of statements, said random selection causing said simulated person to behave unpredictably thereby providing realistic interactive training for the user.

17. An interactive apparatus comprising:
   means for simulating a person in a plurality of vignettes;
   a listing of a plurality of statements to be verbalized by a user of said apparatus;
   a plurality of audio responses for articulation by said simulated person; and
   a logic means for interrelating each of said audio responses, said simulated person and said statements to be verbalized by the user, such that each of said statements can have a plurality of different audio responses and vignettes associated therewith, said logic means comprising:
   a logical component for tracking said audio responses and said vignettes and randomly selecting an audio response and vignette associated therewith from a list of available audio responses and associated vignettes determined by said logical component to be consistent in light of previously selected audio responses and vignettes associated therewith; and
   an emotional component comprising an emotional model of said simulated person, said emotional model determining the direction and magnitude of change between a plurality of emotional states of said simulated person in response to said statements selected by the user, said logical component assigning a probability to each available response on said list based on said simulated person's emotional state and using said probabilities to affect the random selection from said list of one of said plurality of audio responses and one of said plurality of vignettes in response to user verbalized ones of said plurality of statements.

18. An interactive training method comprising the steps of:
- simulating a person in a plurality of vignettes;
- creating a plurality of statements to be verbalized by a user;
- creating means for recognizing verbalized ones of said plurality of statements;
- creating a plurality of audio responses for articulation by said simulated person; and
- creating logic means for interrelating each of said audio responses, said simulated person and said plurality of statements to be verbalized by the user, such that each of said statements can have a plurality of different audio responses and vignettes associated therewith, said logic means comprising:
- a logical component for tracking said audio responses and said vignettes and randomly selecting an audio response and vignette associated therewith from a list of available audio responses and associated vignettes determined by said logical component to be consistent in light of previously selected audio responses and vignettes associated therewith; and
- an emotional component comprising an emotional model of said simulated person, said emotional model determining the direction and magnitude of change between a plurality of emotional states of said simulated person in response to said statements selected by the user, said logical component assigning a probability to each available response on said list based on said simulated person's emotional state and using said probabilities to affect the random selection from said list of one of said plurality of audio responses and one of said plurality of vignettes in response to user verbalized ones of said plurality of statements, said random selection causing said simulated person to behave unpredictably thereby providing realistic interactive training for the user.

19. An interactive apparatus, comprising:
- means for simulating a person in a plurality of vignettes;
- a plurality of statements to be selected by a user of said apparatus;
- a plurality of audio responses for articulation by said simulated person;

and
- a logic means for interrelating each of said statements to be selected by the user, said audio responses and said simulated person, such that each of said statements can have a plurality of different audio responses and vignettes associated therewith, said logic means comprising:
- a logical component for tracking said statements, said audio responses and said vignettes and determining a list of available statements, audio responses and vignettes that is consistent in light of previously selected ones of said plurality of statements, ones of said plurality of audio responses and ones of said plurality of vignettes, said logical component further assigning a probability to each available audio response and vignette on said list based on an emotional state of said simulated person and, using said probabilities and a pseudo-random number generator, selecting one of said plurality of audio responses and one of said plurality of said vignettes from said list.

* * * * *